Patented Mar. 14, 1933

1,901,582

UNITED STATES PATENT OFFICE

CLYDE COLEMAN, OF PASSAIC, NEW JERSEY, ASSIGNOR TO THE NAUGATUCK CHEMICAL COMPANY, OF NAUGATUCK, CONNECTICUT, A CORPORATION OF CONNECTICUT

VULCANIZATION OF RUBBER

No Drawing.   Application filed September 5, 1931. Serial No. 561,503.

This invention relates to the preparation of a new class of chemical compounds and to the resulting products, and to the employment of these compounds in the vulcanization of rubber and other vulcanizable materials.

It has been found that the reaction products prepared by interacting a mercaptothiazole, a primary aromatic amine and formaldehyde under conditions precluding the elimination of hydrogen sulphide form a new and valuable class of vulcanization accelerators. The following probable general formula is assigned to the new accelerators: $R_1$—S—$CH_2$—NH—R wherein R is a substituted or unsubstituted aryl group and $R_1$ is a thiazyl group, for example a benzothiazyl group.

Compounds comprising a benzothiazyl group are numbered for the purposes of this invention as indicated in the following structure:

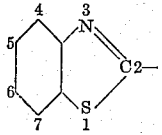

Among the mercaptothiazoles which may be reacted with the primary aromatic amine and formaldehyde are the mercaptoarylthiazoles, such as 2-mercaptobenzothiazole, and homologues and substitution products thereof, for instance 2-mercaptotoluthiazole (sometimes referred to as 2-mercaptotolylthiazole), 2-mercapto-6-nitrobenzothiazole, 2-mercapto-5-nitrobenzothiazole, 2-mercapto-6-chlorobenzothiazole, 2-mercapto-6-ethoxybenzothiazole, 2 mercapto - 5 - chlorobenzothiazole.

The new compounds may be prepared as illustrated in the following examples:

Example A.—Reaction product of mercaptobenzothiazole, formaldehyde, and ortho-toluidine having the probable formula:

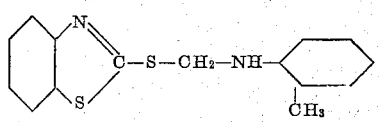

428 grams (4 moles of ortho-toluidine are dissolved in about 1 liter of toluene, and 468 grams (4 moles of mercaptobenzothiazole are added to the toluene solution of ortho-toluidine thus obtained, and the whole mass is thoroughly agitated, the mercaptobenzothiazole remaining largely in suspension. An aqueous solution of formaldehyde of about 38–40% strength containing 4 moles of formaldehyde is then added with agitation, and cooling if necessary. A reaction between the ortho-toluidine, formaldehyde, and the mercaptobenzothiazole takes place quickly at room temperature, and the new product separates as a fine nearly white crystalline solid of a high degree of purity. The product is recovered from the supernatant liquid and freed of solvent. The melting point is about 145–146° C. The amount recovered in this way is about 960 grams (about 83% of theoretical yield). The remaining 17% remains dissolved in the toluene and may be recovered in any suitable way to give a substantially 100% yield.

Example B.—Reaction product of mercaptobenzothiazole, formaldehyde, and para-toluidine having the probable formula

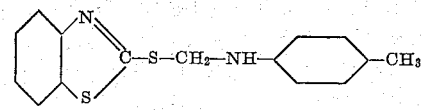

107 grams (one mole) of para-toluidine are dissolved in about 500 cc. of alcohol, and 167 grams of mercaptobenzothiazole are then added and the mixture is thoroughly agitated. An aqueous solution of 38–40% of formaldehyde containing one mole of formaldehyde is then added. The new product, which is the reaction product of para-toluidine, formaldehyde, and mercaptobenzothiazole, separates from the alcohol as a yellowish-white crystalline solid, and is recovered as in the previous example. The product thus obtained weighs about 195 grams. The melting point is about 107° C. which is raised to 110–111° C. by recrystallizing the product from alcohol. About 90 grams of the product remain in solution and may be recovered by any suitable means therefrom; it is identical with the first fraction isolated.

Example C.—Reaction product of mercaptobenzothiazole, formaldehyde and aniline having the probable formula

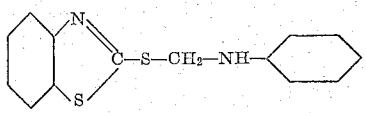

46.5 grams of aniline (0.5 mole) and 83.5 grams of mercaptobenzothiazole (0.5 mole) are added to 300 cc. of alcohol; the mercaptobenzothiazole remains largely in suspension while the aniline is completely dissolved, no reaction occurring between the two materials. Then an amount of formaldehyde solution of about 38% strength containing 15 grams (0.5 mole) of formaldehyde is added and the mixture is agitated. The temperature of the reaction mixture rises to about 30° C. As the reaction proceeds, the contents of the flask begin to assume a lighter color and after about 10-15 minutes the reaction is complete. The reaction mixture is then cooled and 103 grams of the new product, a light yellow crystalline solid, are recovered by filtration. 33 grams of the product remain in solution and may be recovered, if desired, in any suitable manner. The melting point is about 103° C., which may be raised to 110-112° C. by recrystallizing the compound from any suitable solvent such as toluene. Analysis: found S, 23.4%; N, 9.7%. Calculated for $C_{14}H_{12}N_2S_2$: S, 23.5%; N, 10.2%.

Example D.—Reaction product of para-xylidine, formaldehyde, and mercaptobenzothiazole having the probable formula

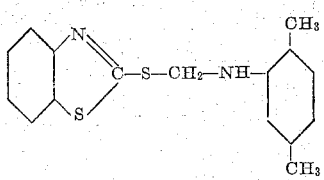

12.1 grams of para xylidine (0.1 mole) are dissolved in about 100 cc. of alcohol, and 16.7 grams (0.1 mole) of mercaptobenzothiazole are added. The mixture is thoroughly agitated, and an amount of formaldehyde solution of about 38% strength containing 3 grams (0.1 mole) of formaldehyde is added. To hasten the reaction the temperature is raised to about 30° C. When substantially all of the mercaptobenzothiazole has reacted with the p-xylidine and formaldehyde, the resulting product, after a short time, begins to separate from the solution as a white, crystalline solid. When the crystallization is complete the reaction product is recovered in any suitable manner. It melts at about 119-120° C. The yield thus obtained is 27.5 grams (theoretical yield 30 grams). An additional amount of the product may be recovered from the mother liquor by any suitable means.

The method of carrying out the process in the presence of a suitable organic solvent, as illustrated in Examples A, B, C, and D, is generally applicable to the preparation of the new compounds by the reaction of formaldehyde and mercaptobenzothiazoles with any primary aromatic amine. It is preferable to employ as the reaction medium an organic solvent in which the reaction product is not too soluble. For this purpose alcohol, benzene, toluene, and xylene are suitable. In the case of the reaction using 2, 5-dichloro aniline or alpha naphthylamine it is more desirable to employ benzene, toluene, or xylene, xylene being preferable on account of the lesser solubility of the products therein and the correspondingly greater ease of recovery of the products.

Other modifications of the process may be employed as illustrated in the following examples:

Example E.—It has been found that a product identical with that of Example C may be prepared in the following manner:

93 grams of aniline, 167 grams of mercaptobenzothiazole and 80 cc of 40% formaldehyde solution are mixed in a vessel with a powerful stirring apparatus, and heated to about 80° C. The contents of the vessel become fluid for a time, and as the reaction proceeds, gradually harden to a light buff homogeneous mass having melting point of 111-112° C.

Example F.—The same product may also be prepared in the following method:

105 grams of anhydro-formaldehyde aniline, prepared by the reaction between formaldehyde and aniline in known manner, and 167 grams of mercaptobenzothiazole are melted together with stirring. On heating for a time at about 80° C, the whole mass sets to a homogeneous solid melting at 111-112° C.

Example G.—The solvents which may be used in the process of Example G are the same as those which may be used in the process of Examples A, B, C, and D.

105 grams of methylene aniline are dissolved in 100 cc of benzol; 167 grams of mercaptobenzothiazole are added, and the solution warmed to 50°-60° C. The mercaptobenzothiazole goes into solution, and soon the product of the reaction crystallizes from the solvent. It melts at 111-112° C. and is identical with the product of Example C.

The method illustrated by the process of Example E is especially suited to make condensations with such bases as aniline, o-toluidine and other fluid or low melting bases. The method illustrated by the process of Examples F and G is applicable in the case of those primary aromatic amines which are capable of formng with formaldehyde the corresponding isolable tertiary methylene bases. Examples of such amines are aniline, o-toluidine, p-toluidine, p-xylidine, p-anisidine, p-chloro-aniline, and beta naphthylamine, all of which may be made to yield the new compounds when treated according to the processes of Examples F or G, as well as by the methods of the other examples.

Examples of products which fall within the scope of the invention are shown in the following table:

| Reaction product of— | Color | M. P. |
|---|---|---|
| | | Degrees centigrade |
| Mercaptobenzothiazole formaldehyde and aniline | Buff | 111–112 |
| Mercaptobenzothiazole formaldehyde and o-toluidine | Buff | 146 |
| Mercaptobenzothiazole formaldehyde and p-toluidine | Buff | 110–111 |
| Mercaptobenzothiazole formaldehyde and p-xylidine | Buff | 120 |
| Mercaptobenzothiazole formaldehyde and o-chlor aniline | Buff | 156 |
| Mercaptobenzothiazole formaldehyde and alpha naphthylamine | Buff | 125 |
| Mercaptobenzothiazole formaldehyde and p-chlor aniline | Buff | 161–162 |
| 5-chloro mercaptobenzothiazole formaldehyde and aniline | Yellowish white | 120 |
| Mercaptobenzothiazole formaldehyde and B-naphthylamine | Light buff | 138 |
| 5-nitro mercaptobenzothiazole formaldehyde and o-toluidine | Yellowish orange | 134 |
| 5-nitro mercaptobenzothiazole formaldehyde and b-naphthylamine | Greenish brown | 115 |
| 5-nitro mercaptobenzothiazole formaldehyde and aniline | Reddish orange | 119–120 |
| Mercaptobenzothiazole formaldehyde and p-anisidine | White | 98 |
| Mercaptobenzothiazole formaldehyde and 2-5 dichlor aniline | Buff | 172 |

Para-formaldehyde or other polymeric forms of formaldehyde may be used in the process of the invention in place of formaldehyde.

The moderate temperatures employed in the processes of the invention cause the reactions to take place without the elimination of any sulphur-containing substances such as hydrogen sulphide; water is eliminated during the condensation of formaldehyde with the amine. All of the reaction products which fall within the scope of the invention are definite crystalline compounds.

The liability of the hydrogen atom of the mercapto group contained in mercaptothiazoles is well known, as is the tendency of such unsaturated groups as the C=N group, present in methylene aryl-imides, to become saturated by the opening up of the double bond and the addition thereto of two monovalent elements or groups, especially when one of the said elements or groups available is labile hydrogen atom. Accordingly, the reactions of the present process are considered to proceed by the addition of the mercaptothiazole to the C=N group of a methylene aryl-imide, the methylene aryl-imide (or tertiary methylene base) being present either by direct addition to the reaction mixture as in Examples F and G, or by reason of its momentary formation in situ in the reaction mixture as in Examples A to E, inclusive. The labile hydrogen atom of the mercapto group wanders to the nitrogen of the methylene imide group, and the residue of the mercaptothiazole molecule becomes attached, through the mercapto sulphur atom, to the carbon atom of the methylene group. These changes may be illustrated by writing the equation for the reaction in the following manner:

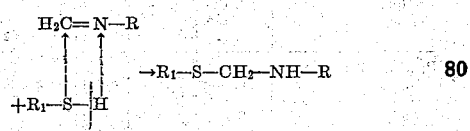

wherein R and $R_1$ are as defined above. The dotted lines indicate the respective points of attachment of the H atom and of the $R_1-S-$ grouping to the C=N group. The equation also shows that the reaction takes place without the elimination of any simpler sulphur-containing substances. All of the elements of the methylene imide and of the mercaptothiazole are seen to be present in the molecule of the final product. It will also be noted that the trivalent nitrogen atom contained in the methylene aryl-imide remains trivalent in the reaction product.

In view of the preceding, it is to be understood that the expression "reaction product" as used in the claims means the product of a reaction in which no hydrogen sulphide is eliminated.

In view of the fact that the polymeric forms of methylene aryl-imides behave chemically as if they were the simple monomers having the formula $R-N=CH_2$, it is obvious that the polymeric forms of said bases are equivalent to the corresponding monomers for the purposes of this invention, and it is to be understood that the expression "methylene aryl-imide" as used in the claims includes both the monomeric and the polymeric forms of said bases.

The new materials of this invention may be used in the vulcanization of various rubber compounds. For the purpose of illustrating the invention, the following examples are given, without limiting it thereto.

Compounds of the following compositions were used:

| | Parts by weight | |
|---|---|---|
| Smoked sheets | 100 | 100 |
| Carbon black | 42 | 42 |
| Sulphur | 3.25 | 3.25 |
| Zinc oxide | 10 | 10 |
| Stearic acid | 3.25 | 3.25 |
| Pine tar | 3.5 | 3.5 |
| Antioxidant | 1.25 | 1.25 |
| New accelerator | 0.8 | |
| Mercaptobenzothiazole | | 1.125 |

| Accelerator | Amount | Cure | | Tensile strength (lbs. per sq. in.) | Per cent elongation at break |
|---|---|---|---|---|---|
| | | Time in minutes | Pressure | | |
| Product of Example A. | 0.8 | 45 | 30# | 4301 | 690 |
| | 0.8 | 60 | 30# | 4433 | 700 |
| | 0.8 | 75 | 30# | 4543 | 680 |
| | 0.8 | 90 | 30# | 4393 | 620 |
| Product of Example C. | 0.8 | 45 | 30# | 4404 | 710 |
| | 0.8 | 60 | 30# | 4277 | 660 |
| | 0.8 | 75 | 30# | 4670 | 670 |
| | 0.8 | 90 | 30# | 4414 | 630 |
| Mercaptobenzothiazole. | 1.125 | 45 | 30# | 4527 | 690 |
| | 1.125 | 60 | 30# | 4463 | 650 |
| | 1.125 | 75 | 30# | 4453 | 640 |
| | 1.125 | 90 | 30# | 4293 | 610 |
| Product of Example B. | 0.8 | 45 | 30# | 3971 | 710 |
| | 0.8 | 60 | 30# | 3925 | 690 |
| | 0.8 | 75 | 30# | 3912 | 660 |
| | 0.8 | 90 | 30# | 4069 | 640 |
| Mercaptobenzothiazole. | 1.125 | 45 | 30# | 4014 | 690 |
| | 1.125 | 60 | 30# | 4213 | 670 |
| | 1.125 | 75 | 30# | 4180 | 650 |
| | 1.125 | 90 | 30# | 4129 | 610 |

As concerns their use in rubber, the new chemicals are not to be restricted to the particular method of preparing them as set forth in detail above, and the claims are to be construed as covering the use of compounds, however prepared, which have substantially the chemical and physical properties of the new chemicals set forth herein.

The invention is useful in connection with any method of curing rubber compounds or goods, and particularly when employed in conjunction with air cures. The accelerator material may be added or incorporated with the rubber at any time prior to the actual vulcanizing operation and may be used in conjunction with any desired antioxidants, softeners, and other compounding ingredients. The presence of zinc oxide and fatty acid or their equivalents is particularly desirable. The accelerator material may be added to latex (artificially prepared or natural) which in turn may be treated in any suitable manner to carry out the purposes of the invention.

The term "rubber" is to be construed broadly and as including any other vulcanizable material such as balata, gutta percha, etc.

The new chemicals disclosed may be used in the preparation of inner tubes, tires, thread, hose, dipped goods, mechanical goods, latex or articles made from latex, etc.

With the detailed description given above, it will be obvious that modifications will suggest themselves without departing from the principle of the invention, and it is not desired to limit the invention otherwise than as set forth in the appended claims.

Having thus described my invention, what I claim and desire to protect by Letters Patent is:

1. A process of treating rubber which comprises vulcanizing rubber in the presence of the reaction product formed by the reaction of equi-molecular proportions of a mercaptobenzothiazole, formaldehyde, and a primary aromatic amine.

2. A process of treating rubber which comprises vulcanizing rubber in the presence of the reaction product formed by the reaction of equi-molecular proportions of mercaptobenzothiazole, formaldehyde, and a primary aromatic amine.

3. A process of treating rubber which comprises incorporating in rubber, sulphur and the reaction product formed by the reaction of equi-molecular proportions of a mercaptobenzothiazole and a methylene aryl-imide having the formula $R-N=CH_2$ in which R is an aryl group.

4. A process of producing vulcanized rubber which comprises vulcanizing rubber containing sulphur in the presence of the reaction product formed by the reaction of equi-molecular proportions of a mercaptobenzothiazole and a methylene aryl-imide having the formula $R-N=CH_2$ in which R is an aryl group.

5. A process of treating rubber which comprises incorporating in rubber sulphur and the reaction product formed by the reaction of equi-molecular proportions of mercaptobenzothiazole and a methylene aryl-imide having the formula $R-N=CH_2$ in which R is an aryl group.

6. A process of producing vulcanized rubber which comprises vulcanizing rubber containing sulphur in the presence of the reaction product formed by the reaction of equi-molecular proportions of mercaptobenzothiazole and a methylene aryl-imide having the formula $R-N=CH_2$ in which R is an aryl group.

7. A process of producing vulcanized rubber which comprises vulcanizing rubber containing sulphur in the presence of the reaction product formed by the reaction of equi-molecular proportions of a mercaptobenzothiazole and methylene aniline.

8. A process of producing vulcanized rubber which comprises vulcanizing rubber containing sulphur in the presence of the reaction product formed by the reaction of equi-molecular proportions of a mercaptobenzothiazole and a methylene toluidine.

9. A process of producing vulcanized rubber which comprises vulcanizing rubber containing sulphur in the presence of the reaction product formed by the reaction of equi-molecular proportions of a mercaptobenzothiazole and methylene o-toluidine.

10. A process of producing vulcanized rubber which comprises vulcanizing rubber containing sulphur in the presence of the reaction product formed by the reaction of equi-molecular proportions of a mercaptobenzothiazole and methylene p-toluidine.

11. A process of producing vulcanized rubber which comprises vulcanizing rubber in the presence of the reaction product formed by the reaction of equi-molecular proportions of a mercaptobenzothiazole, formaldehyde, and aniline.

12. A process of producing vulcanized rubber which comprises vulcanizing rubber in the presence of the reaction product formed by the reaction of equi-molecular proportions of a mercaptobenzothiazole, formaldehyde, and a toluidine.

13. A process of producing vulcanized rubber which comprises vulcanizing rubber containing a vulcanizing agent in the presence of the reaction product formed by the reaction of equi-molecular proportions of mercaptobenzothiazole, formaldehyde, and aniline.

14. A process of producing vulcanized rubber which comprises vulcanizing rubber containing a vulcanizing agent in the presence of the reaction product formed by the reaction of equi-molecular proportions of mercaptobenzothiazole, formaldehyde, and a toluidine.

15. A process of producing vulcanized rubber which comprises vulcanizing rubber containing a vulcanizing agent in the presence of the reaction product formed by the reaction of equi-molecular proportions of mercaptobenzothiazole, formaldehyde, and o-toluidine.

16. A process of producing vulcanized rubber which comprises vulcanizing rubber containing a vulcanizing agent in the presence of the reaction product formed by the reaction of equi-molecular proportions of mercaptobenzothiazole, formaldehyde, and p-toluidine.

17. A process of producing vulcanized rubber which comprises vulcanizing rubber containing sulphur in the presence of a compound having the probable general formula $R_1-S-CH_2-NH-R$ wherein R represents an aryl group and $R_1$ represents a benzothiazyl group.

18. A process of producing vulcanized rubber which comprises vulcanizing rubber containing sulphur in the presence of a compound having the probable general formula $R_1-S-CH_2-NH-R$ wherein R represents an aryl group and $R_1$ represents the benzothiazyl group.

19. A process which comprises adding to rubber prior to actual vulcanization an arylaminomethyl arylenethiazyl sulphide.

20. A process which comprises adding to rubber prior to actual vulcanization an arylaminomethyl benzothiazyl sulphide.

21. A process which comprises adding to rubber prior to actual vulcanization a phenylaminomethyl benzothiazyl sulphide.

22. A vulcanized rubber product resulting from the process as set forth in claim 1.

23. A vulcanized rubber product resulting from the process as set forth in claim 7.

24. A vulcanized rubber product resulting from the process as set forth in claim 8.

25. A vulcanized rubber product resulting from the process as set forth in claim 9.

26. A vulcanized rubber product resulting from the process as set forth in claim 11.

27. A vulcanized rubber product resulting from the process as set forth in claim 12.

28. A vulcanized rubber product resulting from the process as set forth in claim 13.

29. A vulcanized rubber product resulting from the process as set forth in claim 15.

30. A vulcanized rubber product resulting from the process as set forth in claim 16.

31. A vulcanized rubber product resulting from the process as set forth in claim 18.

Signed at Passaic, County of Passaic, State of New Jersey, this 28 day of August, 1931.

CLYDE COLEMAN.